(12) United States Patent
Myers

(10) Patent No.: US 6,504,649 B1
(45) Date of Patent: Jan. 7, 2003

(54) PRIVACY SCREENS AND STEREOSCOPIC EFFECTS DEVICES UTILIZING MICROPRISM SHEETS

(75) Inventor: Kenneth J. Myers, 2 Main St., Apartment 2S, Dobbs Ferry, NY (US) 10522

(73) Assignees: Kenneth J. Myers, Irvington, NY (US); Edward Greenberg, Irvington, NY (US)

(*) Notice: Subject to any disclaimer, the term of this patent is extended or adjusted under 35 U.S.C. 154(b) by 0 days.

(21) Appl. No.: 09/481,942

(22) Filed: Jan. 13, 2000

(51) Int. Cl.$^7$ ............................................... G03B 21/60
(52) U.S. Cl. ........................ 359/454; 359/464; 359/619; 348/59
(58) Field of Search ...................... 359/613, 454, 359/462, 464, 465, 567, 450, 455, 619, 626, 625; 348/14.1, 51, 54, 58, 59

(56) References Cited

U.S. PATENT DOCUMENTS

| | | | |
|---|---|---|---|
| 2,881,686 A | 4/1959 | Ruhle | |
| 2,909,770 A | 10/1959 | Pugsley | |
| 3,258,590 A | * 6/1966 | Goodbar | ..................... 359/454 |
| 3,279,340 A | 10/1966 | Ramberg et al. | |
| 3,718,078 A | 2/1973 | Plummer | |
| 3,902,787 A | 9/1975 | Sherlock | |
| 3,971,051 A | 7/1976 | Baker et al. | |
| 4,165,920 A | 8/1979 | Brown | |
| 4,206,969 A | 6/1980 | Cobb et al. | |
| 4,309,073 A | 1/1982 | Nishimura et al. | |
| 4,309,074 A | 1/1982 | Granieri, Jr. | |
| 4,333,707 A | 6/1982 | West | |
| 4,588,259 A | * 5/1986 | Sheiman | ..................... 359/465 |
| 4,708,435 A | 11/1987 | Yata et al. | |
| 4,756,603 A | 7/1988 | Ohtani | |
| 4,911,529 A | 3/1990 | Van De Ven | |
| 5,208,620 A | 5/1993 | Mitsutake et al. | |
| 5,316,359 A | 5/1994 | Lansinger | |
| 5,317,405 A | 5/1994 | Kuriki et al. | |
| 5,359,691 A | 10/1994 | Tai et al. | |
| 5,363,237 A | 11/1994 | Wakatake | |
| 5,446,594 A | 8/1995 | Nelson et al. | |
| 5,512,219 A | 4/1996 | Rowland et al. | |
| 5,600,455 A | * 2/1997 | Ishikawa et al. | ............... 362/31 |
| 5,663,831 A | * 9/1997 | Mashitani et al. | .......... 359/463 |
| 5,729,387 A | 3/1998 | Takahashi et al. | |
| 5,742,411 A | 4/1998 | Walters | |
| 5,835,661 A | 11/1998 | Tai et al. | |
| 5,836,096 A | 11/1998 | Brauer | |
| 5,837,346 A | 11/1998 | Langille et al. | |
| 5,896,225 A | * 4/1999 | Chikazawa | .................. 359/463 |
| 5,900,972 A | * 5/1999 | Chikazawa | .................. 359/464 |
| 5,926,601 A | 7/1999 | Tai et al. | |

* cited by examiner

Primary Examiner—Cassandra Spyrou
Assistant Examiner—Lee Fineman
(74) Attorney, Agent, or Firm—Bacon & Thomas

(57) ABSTRACT

A privacy screen, an image separating screen suitable for creating stereoscopic images, and an image interlacing screen also suitable for use in creating stereoscopic images, are prepared by modifying a standard microprism sheet of the type having a plurality of v-shaped grooves. The modifications may include altering the transmission properties of at least one surface of each groove in such a manner that light transmitted in different directions has different properties, for example by attenuating light in one plane and not in the second plane to create a privacy screen, or by altering polarizations in the two planes so as create a stereoscopic effect. The modifications may also include arranging the microprism sheet to interlace images from different sources.

5 Claims, 2 Drawing Sheets

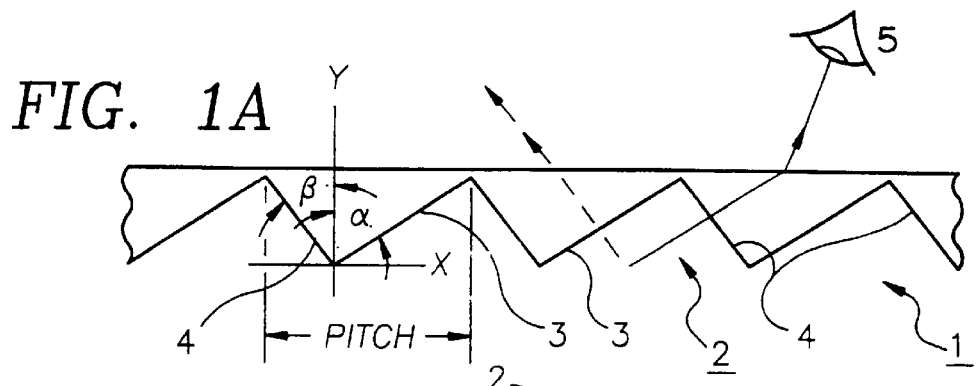
FIG. 1A
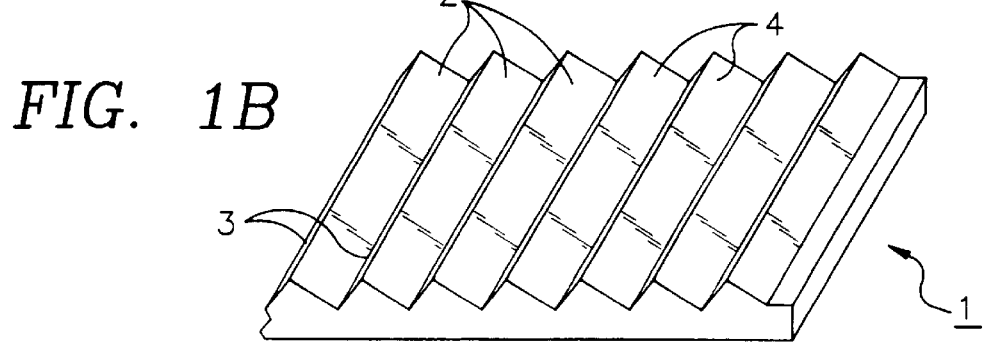
FIG. 1B
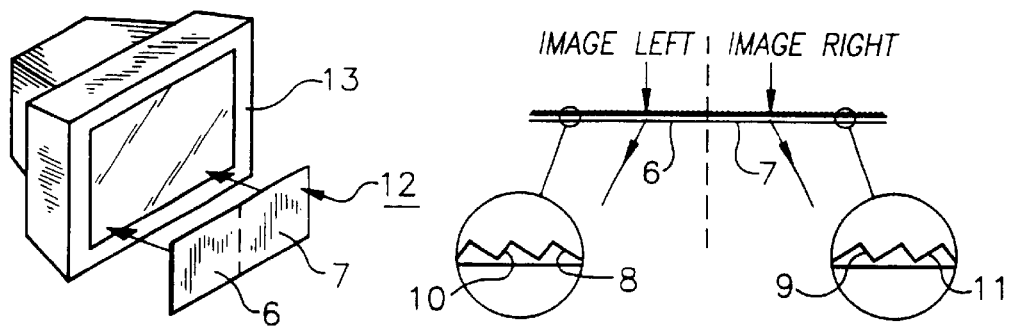
FIG. 2B   FIG. 2A(1)   FIG. 2A(2)
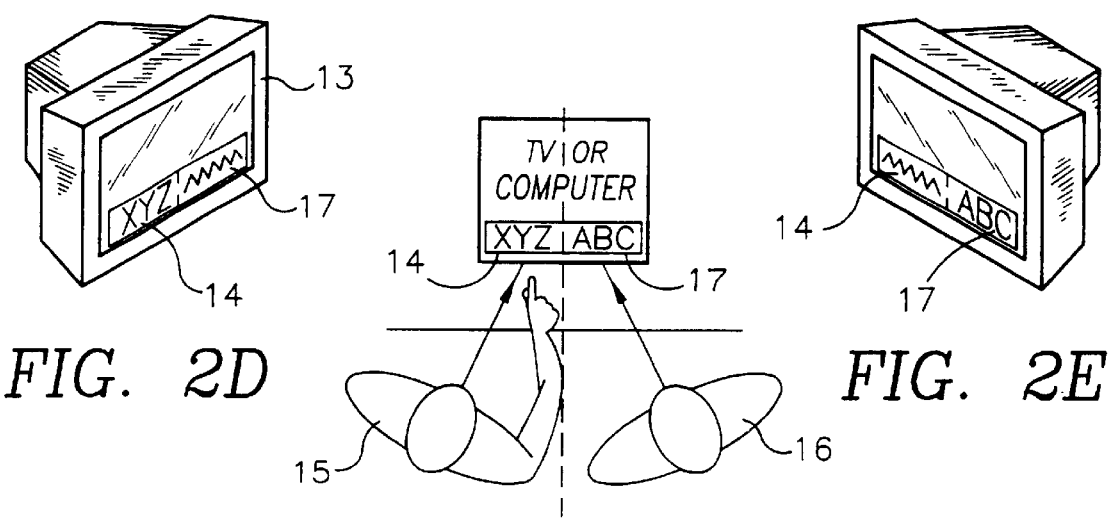
FIG. 2D   FIG. 2E
FIG. 2C

PRIVACY SCREENS AND STEREOSCOPIC EFFECTS DEVICES UTILIZING MICROPRISM SHEETS

BACKGROUND OF THE INVENTION

1. Field of the Invention

This invention relates to privacy screens and stereoscopic effects devices that use microprism sheets.

Each of the preferred embodiments of the invention has in common the transmission of light through a single microprism sheet made up of a transparent substrate in which are formed linear grooves having planar surfaces which intersect to form a v-shaped cross-section, the two sets of planar surfaces on respective sides of the grooves being selectively arranged to block or alter light transmitted through the sheet.

The microprism sheets used in the various preferred embodiments provide privacy screening and stereoscopic effects with an especially simple and low cost construction, and can easily be manufactured and/or assembled for use in a variety of applications.

The invention has three principal embodiments:

(i) The first principal embodiment relates to a privacy screen, and in particular to modification of a microprism sheet to emulate a privacy screen, to devices utilizing such privacy screen emulation arrangement, and to methods of making a privacy screen;

(ii) The second principal embodiment relates to stereoscopic image separation, and in particular to modification of a microprism sheet to separate interlaced images for the purpose of creating stereoscopic effects, to an arrangement utilizing such a stereoscopic microprism sheet, and to methods of making a stereoscopic microprism sheet;

(iii) The third principal embodiment relates to use of a microprism sheet to create interlaced images from separate sources such as a split screen, and which may be used in connection with the image separating arrangement of the second principal embodiment.

According to the first embodiment of the invention, a privacy screen is made up of a microprism transmission sheet. The microprism sheet of this embodiment is similar to the ones disclosed in U.S. Pat. No. 2,909,770 (Pugsley) and U.S. Pat. No. 4,756,603 (Ohtani) in that one of the two surfaces or facets of a microprism made up of v-shaped grooves is altered to attenuate or scatter light incident on the surface or facet, but instead of attenuating reflected light originating outside the image path, the modified microprism sheet of this embodiment of the invention attenuates or scatters light that would normally be within the optical path from the image source to a viewer situated in front of the microprism sheet, thereby providing a louvre or privacy screen effect.

According to the second embodiment of the invention, instead of preventing transmission of light through one of the surfaces or facets of an otherwise conventional microprism sheet, each of the two surfaces or facets of a microprism sheet made up of v-shaped grooves is modified to polarize light in an opposite direction. When the image source is an interlaced image, the oppositely polarized light may be recombined by corresponding polarized lenses to provide a stereoscopic effect. When a microprism sheet having a groove pitch corresponding to the pitch of the interlaced images is positioned over the interlaced images, the different sections of the interlaced image will be transmitted in different directions and oppositely polarized so that each lens will see a different channel for an enhanced three dimensional image.

According to the third embodiment of the invention, instead of altering the properties of light transmitted through the respective surfaces or facets of a microprism sheet made up of v-shaped grooves, the angles of the surfaces or facets on different portions of the microprism sheet are arranged so as to interlace separate images. This eliminates the need to interlace images during production, allowing the different portions of the image to be separately stored or transmitted and interlaced at the viewing end. Separation of the images for stereoscopic viewing can be in a conventional fashion using colored glasses or by means of the arrangement of the second principal embodiment of the invention.

2. Description of Related Art

Microprism sheets in the form of molded substrates with small prisms embedded within the material are well-known. The present invention involves various modifications or re-arrangements of a particular type of known microprism sheet in which a clear plastic material is formed with linear grooves, each having a v-shaped cross-section. Unlike prior devices involving multiple layers of microprism sheets, or microprism sheets combined with structures such as emicrolenses or light guides, each of the embodiments of the present invention utilizes a single microprism sheet, which may take the form of an overlay for a computer monitor or television, or which may be formed as an integral part of the monitor or television screen.

The prior art generally falls into one of two categories: (i) microprism sheets and devices using microprism sheets in which an image is uniformly transmitted through the microprism sheet, each facet of the microprism having identical light transmission properties and the facets being arranged in a uniform fashion across the sheet; and (ii) microprism sheets and devices utilizing microprism sheets in which one of the surfaces or facets of the microprisms in the sheet is altered in such a way as to reduce glare or reflections without affecting transmission of an image through the sheet.

The first category of prior art provides technical background concerning the materials and formation of microprism sheets and the manner in which light is transmitted through the sheets. Except as noted below, the materials and geometry of the sheets used in the preferred embodiments of the invention can easily be selected by those skilled in the art based on the principles disclosed in these patents, once the overall concepts of privacy screen emulation and image separation or interlacing are understood.

Examples of patents directed to microprism sheets in general, and to devices using microprism sheets, include the following: U.S. Pat. No. 5,836,096 (Brauer), U.S. Pat. No. 5,446,594 (Nelson et al.), U.S. Pat. No. 5,363,237 (Wakatake), U.S. Pat. No. 5,316,359 (Lansinger), U.S. Pat. No. 5,208,620 (Mitsutake et al.), U.S. Pat. No. 4,708,435 (Yata et al.) , U.S. Pat. No. 4,309,074 (Granieri), U.S. Pat. No. 4,309,073 (Nishimura et al.), U.S. Pat. No. 3,902,787 (Sherlock), and U.S. Pat. No. 4,206,969 (Cobb et al.) Each of these patents discloses transmission or projection devices that utilize microprism or Fresnel structures for the purpose of glare reduction or optimizing light transmission at all potential viewing angles. Also of general background interest is the transmission screen disclosed in U.S. Pat. No. 5,317,405, which uses Fresnel microprism structures to transmit an image from a television while at the same time reflecting an image of the viewer to a camera, and U.S. Pat. Nos. 5,835,661, 5,926, 601, and 5,359,691, all to Tai et al., which relate to light guide structures using microprisms.

None of these patents discloses alteration of selected facets or surfaces in different intersecting planes to emulate a privacy screen or separate images according to the principles of the first and second embodiments of the present invention, or the arrangement of the planes to interlace images according to the principles of the third embodiment of the present invention.

U.S. Pat. No. 5,512,219 is of interest for its general disclosure of methods of making microprism sheets by casting, while U.S. Pat. No. 3,718,078 (Plummer) is of interest for its description of the use of acid etching for the purpose of creating light diffusing surfaces for non-glare glass and for focusing screens for cameras ("focusing screens" are reflective surfaces used in cameras as disclosed in U.S. Pat. No. 3,971,051 (Ruhle)). In addition, U.S. Pat. No. 5,837,346 is of interest for its description of methods of making "bulk diffusion screens," which may configured for collimation "after the fashion of Fresnel lenses" and in which surface relief features may be formed by hot or cold embossing, by casting, or in any other way, and which may include reflective rear coatings formed by a particulate deposition process for use in front projection screens, or diffusion patterns created by photopolymerization. Those skilled in the art will appreciate that many of the methods of making or altering microprism sheets disclosed in these patents may also be used in making the microprism sheets of the preferred embodiments of the invention, and that the invention in its broadest form is not intended to be limited to any particular method of making or altering the sheets.

The second category of prior art includes U.S. Pat. No. 2,909,770 (Pugsley), U.S. Pat. No. 4,756,603 (Ohtani), and U.S. Pat. No. 4,165,920(Brown), which describe arrangements in which one of the facets or surfaces of a microprism or Fresnel structure is altered by providing a light blocking or coating or treatment. These patents are most relevant to the first and second embodiments of the invention, in which a microprism sheet having linear grooves with a v-shaped cross-section is modified by altering the light transmission properties of at least one of the surfaces of each groove by attenuating or scattering light emitted in one direction. In particular, these patents describe the inclusion of light absorbing or scattering coatings or structures on selected microprism facets or surfaces, although they do not specifically suggest the use of such coatings or structures for the purpose of emulating a privacy screen, i.e., for altering the transmission properties of one of the surfaces or, facets relative to another, or for the purpose of separating an image into components that can be re-combined to form a stereoscopic image.

To the contrary, where image transmission is of concern in these patents, the microprisms tend to be arranged to increase the angles at which an image transmitted through the sheet is visible, even while limiting glare or reflections. Unlike the privacy screens of the first preferred embodiment of the invention, the glare reduction sheets disclosed in these patents seek to block only externally or internally reflected light and not to affect transmission of the image, whereas in the first embodiment of the invention, light is blocked in the path of the image to a viewer situated at a normal viewing angle. The privacy screens or stereoscopic imaging sheets of the invention, while superficially similar in structure to those used in the various embodiments of the present invention, are thus not to be confused with the glare reduction screens disclosed in this second category of patents, including the ones disclosed in U.S. Pat. No. 2,909,770 (Pugsley), U.S. Pat. No. 4,756,603 (Ohtani), and U.S. Pat. No. 4,165,920 (Brown).

The different functions of the prior microprism sheets having treated surfaces or facets manifest themselves in the different angles and arrangement of the microprism surfaces relative to those of the present invention. For example, U.S. Pat. No. 2,909,770 (Pugsley) discloses a transmission screen for a projection television receiver, slide projector, or the like, in which a microprism-like structure includes two surfaces, one of which is oriented at a 45° angle so that light incident in the viewing direction is reflected away from the viewer, and the other of which is oriented parallel to the light transmission path so that it does not affect light transmission. To prevent multiple refractions and reflections of light off the microprism structure, the parallel (or "horizontal") surface of Pugsley is "coated with a black or light-absorbent substance 6, such, for example, as dull black paint." Because of its parallel orientation, the coated surface of Pugsley, even though similar to that of the invention, does not serve as a privacy screen, but rather is arranged so as to maximize absorption of reflected light and minimize absorption of transmitted light.

Similar glare or reflection suppressing transmission screen arrangements are disclosed in U.S. Pat. No. 4,756, 603 (Ohtani) and U.S. Pat. No. 4,165,920 (Brown). However, the arrangement of Brown is even less suitable than that of Pugsley for use as a privacy screen since Brown only coats a portion of the facets with an opaque material, while Ohtani discloses equally preferred alternatives involving treatment of a portion of the facets or the entire facets to reduce reflections, demonstrating a lack of concern or recognition of the potential to use the methods disclosed therein for privacy screening purposes. On the other hand, the Ohtani patent is of particular interest because, instead of coating the facets, the facets are altered by forming irregularities in the horizontal plane or at the peaks of the facets, the formation of irregularities being one of the methods that can be utilized to achieve the privacy screen of the first preferred embodiment of the invention Similar glare reduction principles have also been applied to front projection screens, in which an image is projected onto the screen. For example, the structure disclosed in U.S. Pat. No. 4,911,529 (Van De Ven), includes a rear side reflective Fresnel or microlens structure and a front side Fresnel structure. Again, however, the facets of the front side Fresnel structure that are coated with a light absorbing material are parallel or "horizontal" facets rather than facets or surfaces through which the image would normally be transmitted to a viewer, and thus Van De Ven does not suggest a privacy screen effect, the purpose of the arrangement of Van De Ven being to prevent reflection of off-axis light that would blur the reflected image.

In general, the light absorbing materials used in the transmission screens of these patents must be placed on facets oriented perpendicular to the viewer, or to the image transmission path, so that they do not interfere with transmission or reflection of the image. The purpose of the transmission screen overlays of Pugsley, Ohtani, and Van De Van is essentially to optimize transmission or reflection of the image while suppressing ambient light that does not contribute to the image. Thus, even though microprism sheets are widely available and well-known, they have previously only been used in antiglare arrangements or in relatively complex light guiding or focusing devices. The possibility of modifying microprism sheets to form privacy screens or to separate an image to obtain a stereoscopic effect, or of arranging the sheets to interlace images, has not previously been recognized. There is no known prior art involving the use of microprism sheets as privacy screens, or to separate or interlace images for the purpose of creating stereoscopic effects.

Finally, those skilled in the art will appreciate that the microprism privacy screen of the first preferred embodiment of the invention could possibly be used in applications other than those involving television or computer displays, such as in applications involving light collection rather than image transmission. In this regard, U.S. Pat. No. 5,729,387 is of interest for its disclosure of the use of microprism sheets for light focusing purposes in a solar lighting apparatus, although this patent does not disclose or suggest any sort of privacy screen or louvre effect.

SUMMARY OF THE INVENTION

It is accordingly a first objective of the invention to extend the range of applications for microprism sheets to include a simple and inexpensive privacy screen, an image separating screen suitable for creating stereoscopic images, and an image interlacing screen also suitable for use in creating stereoscopic images, by modifying a standard microprism sheet of the type having a plurality of v-shaped grooves, to
 a) alter the transmission properties of at least one surface of each groove in such a manner that light transmitted in different directions has different properties and thereby
  a1) create a privacy screen by attenuating light in one plane and not in the second plane, or
  a2) separate interlaced images for a stereoscopic effect by altering polarizations in the two planes, or
 b) by arranging the standard sheet to have transmission angles which cause interlacing of images from separate sources, the interlaced images being useable to create a stereoscopic effect.

It is a second objective of the invention to provide a privacy screen that is simple to manufacture and that can easily be applied to a computer display or television so as to limit viewing of a displayed image to persons situated at a particular angle relative to the display or television.

It is a third objective of the invention to provide a simple and inexpensive privacy screen that can easily be applied to a computer display or television so as to selectively reveal portions of a displayed image to different viewers situated at different positions in front of the display or television.

It is a fourth objective of the invention to provide novel applications for microprism sheets arranged to emulate a privacy screen, and to provide various methods of making such privacy screen emulating microprism sheets.

It is a fifth objective of the invention to provide a simple and inexpensive device for separating images into components that can be recombined by lenses or glasses to form a stereoscopic image, and to provide methods of making such sheets.

It is a sixth objective of the invention to arrange standard microprism sheets in such a manner that they interlace images from separate sources to create an interlaced image suitable for stereoscopic viewing or to provide various other visual effects.

These objectives are achieved, according to a first preferred embodiment of the invention, by modifying a microprism sheet of the above-described type, i.e., a microprism sheet having substantially linear, v-shaped grooves, so that one of the intersecting surfaces attenuates or scatters transmitted light, thereby forming a privacy screen which permits viewing of an image in the direction of the untreated surface and prevents viewing of the image through the treated surface. The microprism sheet may be used either as a screen overlay to prevent persons from viewing the image who are not positioned directly in front of or at a specific angle relative to the screen, or in the form of a dual screen overlay to permit two persons to view different portions of an image displayed on a single screen.

Because of its simplicity and low cost, the privacy screens of this embodiment of the invention can be used in a wide variety of novel applications, such as to provide a screen overlay for two-player gaming applications. In such applications, the privacy screen blocks portions of an image in selected directions so that each player sees a different image.

The objectives of the invention are further achieved, according to a second preferred embodiment of the present invention, by modifying a microprism sheet of the above type so that one of the surfaces is polarized in a first direction and the other surface is polarized in the opposite direction, thereby providing a sheet in which light exiting the sheet in different directions is oppositely polarized. The angle at which the light is caused to exit the sheet is such that an interlaced image, when viewed by appropriately spaced lenses or eyeglasses, will be separated to obtain a stereoscopic effect. The microprism sheet of this embodiment may also be used as a screen overlay.

The objectives of the invention are also achieved, in accordance with a third preferred embodiment of the invention, by providing a microprism sheet having one set of surfaces oriented at a first angle corresponding to a position of a first image source, and a second set of surfaces oriented at a second angle corresponding to a position of a second image source so as to interlace the images. By appropriately selecting the first and second angles, the interlaced images can be made to project into the same plane for stereoscopic viewing using the arrangement of the second preferred embodiment, or into separate planes to provide a pseudo-stereoscopic effect without the need for additional lenses. Alternatively, if the images are pre-polarized or otherwise differentiated at the source, the interlaced images can be directly combined to exhibit a three-dimensional stereoscopic effect when viewed directly through corresponding lenses, or even, for appropriately recorded first and second images, combined for true stereoscopic viewing without the need for special lenses.

In each of the embodiments of the invention involving treated surfaces, whether for purposes of creating a privacy screen or for creating a stereoscopic effect, the surfaces may be treated by coating, delustering, chemical or laser etching, or casting. In the case of chemical or laser etching, surfaces may be made opaque by roughening, either by applying the chemical or directing the laser at he surface through an appropriate mask, or by etching the casting tool or die that forms the sheet. Alternatively, surfaces cast with texturing or a satin finish may be differentially polished to transmit light in the desired direction.

According to yet another aspect of the invention, the planes of the sheet that form the privacy screen could be provided with a visible pattern, for example through the use of colors, so as to form an image to provide a message, advertisement, or the like.

BRIEF DESCRIPTION OF THE DRAWINGS

FIG. 1A is a top view of a microprism sheet arranged to emulate privacy screen in accordance with the principles of a first preferred embodiment of the invention, in which x and y are horizontal axes respectively extending parallel to and perpendicular to the principal plane of the microprism sheet.

FIG. 1B is an isometric view of the microprism sheet of FIG. 1A

FIG. 2A is a top view of a two-player game application of the microprism sheet of FIGS. 1A and 1B.

FIG. 2B an isometric view showing the manner in which the microprism sheet of FIG. 2A is arranged on a computer monitor or television.

FIG. 2C is a schematic diagram illustrating the operation of the two-player game application shown in FIGS. 2A and 2B.

FIGS. 2D and 2E are isometric views further illustrating the operation of the two-player game application shown in FIGS. 2A and 2B.

DETAILED DESCRIPTION OF THE PREFERRED EMBODIMENTS

Figure 3:
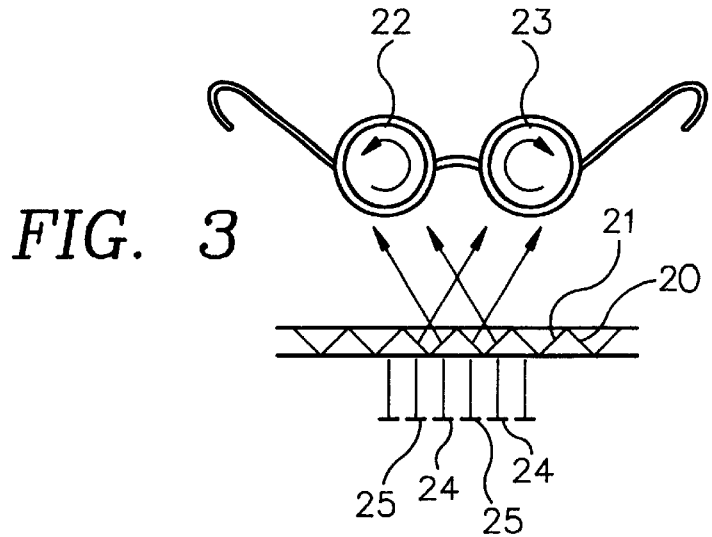
FIG. 3 is a schematic diagram illustrating a microprism sheet arranged to separate an image and provide a stereoscopic effect according to the principles of a second preferred embodiment of the invention.
Figure 4:
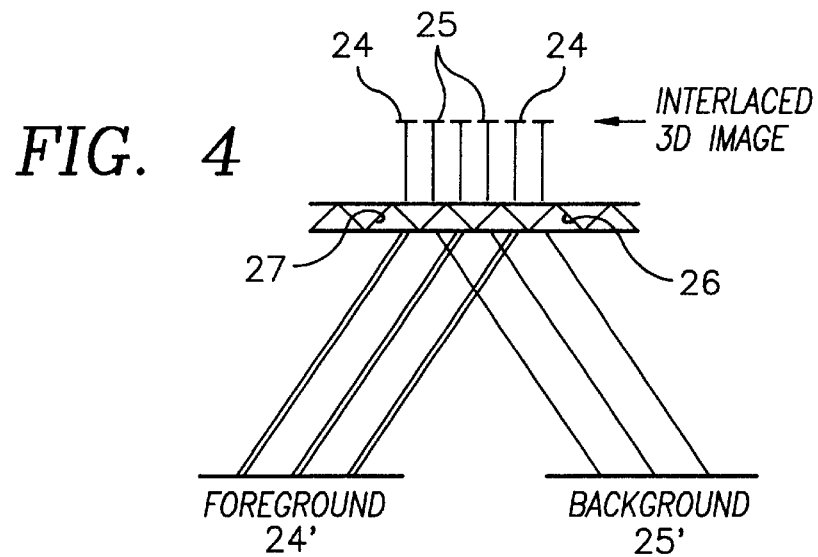
FIG. 4 is a schematic diagram illustrating a microprism sheet arranged to interlace separate images and provide a stereoscopic effect according to the principles of a third preferred embodiment of the invention.

FIGS. 1A and 1B illustrate the manner in which a microprism sheet 1, which is of the type having v-shaped linear grooves 2 defined by surfaces 3 and 4 extending at respective angles $\alpha$ and $\beta$ relative to an axis Y transverse to the principal plane of sheet 1, is arranged to emulate a privacy screen according to the principles of a first preferred embodiment of the invention. As illustrated, privacy screen emulation is obtained by modifying surfaces 3 so as to attenuate or scatter light transmitted therethrough.

Except for the modification of surfaces 3 to attenuate or scatter light, microprism sheet 1 may be of conventional construction and materials. Modification of surfaces 3 can be carried out by any of the methods described in the prior patents cited above, including coating the surfaces with an opaque material and casting irregularities into the surfaces, or the surfaces may be modified by delustering, and/or chemical or laser etching. In the case of chemical or laser etching, surfaces may be made opaque by roughening, either by applying the chemical or directing the laser at the surface through an appropriate mask, or by etching the casting tool or die that forms the sheet. In addition, or alternatively, surfaces originally cast with texturing or a satin finish could be polished to permit transmission of light, as could the planar rear surface of the microprism sheet, in which case the "altered" surfaces would be the light transmitting surfaces, or an additional printed black-and-white or color image could be applied to the light attenuating surfaces so that the person viewing the privacy screen would see the printed image rather than the image transmitted through the microprism sheet.

Because of the alteration of surfaces 3 to attenuate or scatter light transmitted therethrough (or the alteration of surfaces 4 to permit transmission of light), only persons situated in the path of light transmitted through surfaces 4, represented schematically in FIG. 1A by an "eye" 5, will be able to view an image situated behind the microprism sheet 1. Anyone situated at an angle greater than $\beta$ will have no line-of-sight to surfaces 4 and therefore be screened from the image.

The pitch of the grooves and angles of the respective planes will depend on the particular application. However, those skilled in the art will appreciate that the smaller the pitch, the less visible the grooves, for a smoother appearance. The angles at which viewing is optimal and/or at which a viewer will be unable to perceive an image will of course depend on the exact angles $\alpha$ and $\beta$ of surfaces 3 and 4 and the index of refraction of the material from which microprism sheet 1 is constructed. In general, for a standard acrylic microprism sheet including parallel grooves having a pitch of 0.12 to 0.14 inches, an effective and practical privacy screen can be obtained if angle a is set at between 45° and 60°, and angle $\beta$ is set at between 45° and 30° relative to axis Y. For example, a privacy screen effect can be achieved with- a microprism sheet having a pitch of 0.13 inches, an angle $\alpha$ of 20°, and an angle $\beta$ of 40° (i.e. 50° from the plane of the sheet)

In addition to screening an image from those who would otherwise be able to view the image through surfaces 3, those skilled in the art will appreciate that alteration of surfaces 3 will also have the benefit of reducing glare and improving the contrast of images transmitted through surfaces 4 according to the principles described, for example, in U.S. Pat. No. 2,909,770 (Pugsley) and U.S. Pat. No. 4,756,603 (Ohtani), herein incorporated by reference. Those skilled in the art will appreciate that the difference between the microprism sheets disclosed by Pugsley and Ohtani and that of the preferred embodiment is that the altered surfaces of the microprism sheets of Pugsley and Ohtani are horizontal surfaces oriented so as not to affect transmission of the image to any potential viewer, whereas the altered surfaces of the microprism sheets of the preferred embodiment are visible to anyone situated outside a relatively narrow range of angles within which the transmitted image is intended to be viewed. Except for the orientation of the altered surfaces, the construction of the privacy screen of this embodiment may be similar to that used in the anti-glare screens of Pugsley and Ohtani.

While FIG. 1B illustrates the v-shaped grooves as being both linear and parallel, those skilled in the art will recognize that it is possible to provide a privacy-screening microprism sheet having grooves that curve, so as to extend the screening effect to three dimensions. Such an arrangement would not only frustrate eavesdroppers positioned to the right or left of a person viewing an image on the screen, but also prevent eavesdropping from above or below the person.

Alternatively, as illustrated in FIGS. 2A and 2B, the microprism sheet may be arranged such that one portion 6 of the sheet is arranged to screen an image in one direction and a second portion 7 of the sheet is arranged to screen an image in a second direction. In this variation of the first preferred embodiment of the invention, the grooves 8 and 9 of respective portions 6 and 7 of the microprism sheet have light attenuating or scattering surfaces 10,11 oriented to prevent transmission of light to persons positioned on opposite sides of a plane bisecting the microprism sheet, and corresponding light transmitting surfaces that direct transmitted light to the appropriate positions. Those skilled in the art will appreciate that the term "portions" may refer to physically discrete sheets having respective grooves oriented in different directions and which are either joined together or simply located in close proximity to each other, rather than a single sheet having grooves oriented in different directions.

The microprism sheet of this variation of the first preferred embodiment of the invention may be arranged as an overlay 12 for part or all of the screen of a computer monitor or television 13, as shown in FIG. 2B, and is especially suitable for use in connection with a two-player video game, as illustrated in FIGS. 2C–2E. In particular, portion 6 of the microprism sheet illustrated in FIG. 2A is arranged to direct the first image 14 on the left side of the screen to first player 15 while screening image 14 from the second player 16. On the other hand, the portion 7 of the microprism sheet of the variation of the first preferred embodiment illustrated in FIG. 3A is arranged to direct a second image 17 to second player 16 while screening image 17 from first player 15.

As a result, different information or scenes can be provided to each player through the same monitor or television, so that player 15 sees the display illustrated in FIG. 2D while player 16, looking at the same monitor or television, sees the display illustrated in FIG. 2E. By way of example, a game could be devised in which scores or answers were provided to one player and not the other. Alternatively, the microprism sheet could be used in connection with more realistic two player fight or battle simulations, hide-and-seek games, or more traditional "board" games, in which each player is provided with a unique perspective. If the pitch of the grooves is made small enough, the grooves of the privacy screen will not be visible to either player even though the effects of the privacy screen will be immediately apparent.

A variation of the concept of altering one of the surfaces of a microprism sheet to create a privacy screen is illustrated in FIG. 3. In the arrangement disclosed in FIG. 3, surfaces 20 and 21 corresponding to surfaces 3 and 4 of the embodiment illustrated in FIG. 1 are altered to polarize light in opposite directions, and to direct the polarized light towards corresponding oppositely polarized eyeglass lenses 22 and 23. Because lens 22 will only pass light transmitted at a first angle by surfaces 21, and lens 23 will only pass light transmitted at a second angle by surfaces 20, then so long as the pitch of the grooves corresponds to the pitch of left and right channel interlaced image sections 24 and 25, image sections 24 and 25 will be transmitted through the appropriate surfaces 20 and 21, and an enhanced stereoscopic effect can be obtained in an especially simple manner.

One advantage of this arrangement is that a person wearing the polarized lenses 22 and 23, made possible by the use of a microprism sheet including polarizing surfaces 20 and 21, will be able to view other objects or persons without having to take off the lenses, which is not the case with conventional stereoscopic effects lenses that rely on different colors to separate channels. In other words, the stereoscopic effect will be "magically" created by what appears to be a completely transparent screen overlay and ordinary glass lenses.

According to a third preferred embodiment of the invention, a microprism sheet is arranged such that light from a first image 24' is refracted by surfaces 26 and light from a second image 25' is refracted by surfaces 27 to form a single interlaced image 24,25. In this embodiment, the angles of surfaces 26 and 27 are selected based on the relative positions of the separate images, which originate from a split screen or separate screens, and on the desired positions of the interlaced images. Although illustrated as being oriented at non-zero angles, those skilled in the art will appreciate that the surfaces in this embodiment could be arranged to include a transverse surface such that only one of the separate images to be interlaced is refracted.

Figure 5:
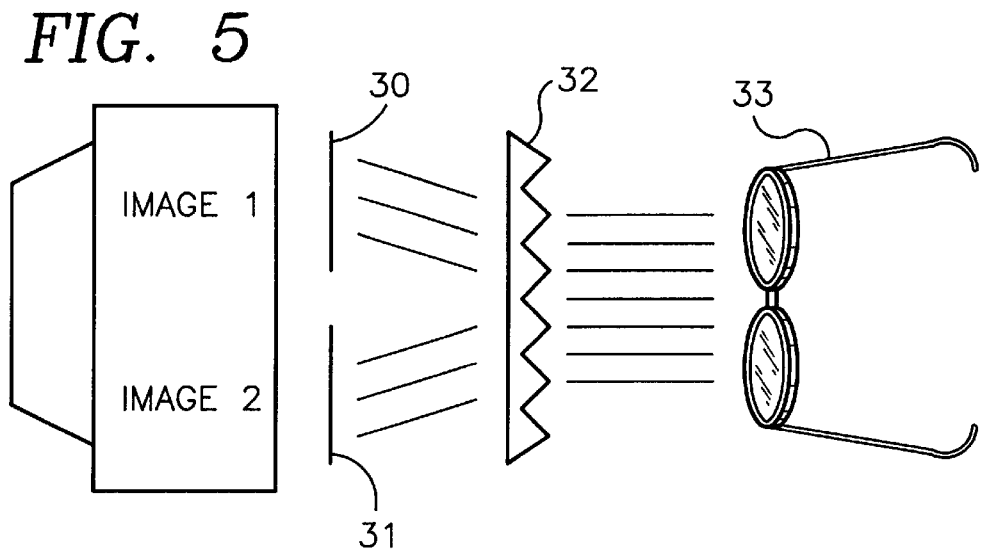
FIG. 5 is a schematic diagram illustrating an application of the image interlacing arrangement of FIG. 4.

One application of the arrangement of the third preferred embodiment of the invention is to interlace images for use in connection with the stereoscopic effects sheet of FIG. 3. Alternatively, the interlaced image, 24, 25 could be arranged to project in the same plane or in different planes. Also, as illustrated in FIG. 5, if the image sources are polarize in opposite directions or otherwise differentiated, for example by opposite direction polarizes 30 and 31, the images can be interlaced by a microprism sheet such as sheet 32 to form a combined image suitable for direct stereoscopic viewing through conventional stereoscopic eyeglass lenses 33. Finally, for appropriate source images, the images can even be combined to form as stereoscopic image viewable without the need for special lenses.

On the other hand, the arrangement of the third preferred embodiment could simply be used to combine normally separated images, for example to add a changing foreground to a fixed background, to permit the addition of foreground characters to a pre-recorded background, or to permit closed captions or subtitles to be added at the point-of-display rather than at the broadcast location or during recording.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention. For example, a privacy screen or stereoscopic effect could be obtained for a reflected rather than transmitted image, and the privacy screen concept could be extended to light. collection apparatus rather than just to image display devices. Accordingly, it is intended that the invention not be limited by the above description or accompanying drawings, but that it be defined solely in accordance with the appended claims.

What is claimed is:

1. An image transmission device, comprising:

a microprism sheet including first and second portions arranged such that each of two viewers situated in front of the sheet is able to exclusively view a different portion of an image transmitted by the microprism sheet, each of said first and second microprism sheet portions comprising a substrate and a plurality of grooves having intersecting sides that form a v-shape, the sides of the grooves forming first and second sets of substantially planar surfaces orientated at non-zero angles relative to a plane extending transversely to a principal plane of the microprism sheet, wherein the first set of substantially planar surfaces of said first microprism sheet portion has light attenuation or scattering properties that are different than corresponding light attenuation or scattering properties of the second set of substantially planar surfaces of said first microprism sheet portion so as to permit a first portion of said image situated behind the microprism sheet to be viewed along an optical path that extends through the microprism sheet and through the first set of surfaces of said first microprism sheet portion to a first of said two viewers situated at a first position in front of the microprism sheet while preventing said first portion of said image from being viewed by a second of said two viewers along an optical path that extends through the microprism sheet and through the second set of surfaces of said first microprism sheet portion when the second of said two viewers is situated at a second position in front of the microprism sheet, and wherein the first set of substantially planar surfaces of said second microprism sheet portion has light attenuation or scattering properties that are different than corresponding light attenuation or scattering properties of the second set of substantially planar surfaces of said second microprism sheet portion so as to permit the second portion of said image situated behind the microprism sheet to be viewed by said second of said two viewers along an optical path that extends through said first set of surfaces of said second microprism sheet portion while preventing said second portion of said image from being viewed by said first of said two viewers along an optical path that extends said second set of surfaces of said second microprism sheet portion.

2. An image transmission device as claimed in claim 1, wherein the different light transmission properties include an opacity of the first and second sets of surfaces, wherein the first set of surfaces is transparent and the second set of surfaces is substantially opaque.

3. An image transmission device as claimed in claim 1, wherein the second set of surfaces is coated with a light attenuating material.

4. An image transmission device as claimed in claim 1, wherein the second set of surfaces is textured.

5. An image transmission device as claimed in claim 1, wherein the first set of surfaces is polished and the second set of surfaces is not polished.

* * * * *